(12) United States Patent
Stone

(10) Patent No.: US 9,108,462 B1
(45) Date of Patent: Aug. 18, 2015

(54) INDUSTRIAL CASTER GUARD

(71) Applicant: Keith J. Stone, East Longmeadow, MA (US)

(72) Inventor: Keith J. Stone, East Longmeadow, MA (US)

( * ) Notice: Subject to any disclaimer, the term of this patent is extended or adjusted under 35 U.S.C. 154(b) by 0 days.

(21) Appl. No.: 14/195,236

(22) Filed: Mar. 3, 2014

(51) Int. Cl.
*B60B 33/00* (2006.01)

(52) U.S. Cl.
CPC .............. *B60B 33/00* (2013.01); *Y10T 16/216* (2015.01)

(58) Field of Classification Search
CPC ....... Y10T 16/216; Y10T 16/18; Y10T 16/19; Y10T 16/184; B60B 7/00; B60B 7/01; B60B 7/02; B60B 7/04; B60B 7/06; B60B 7/061; B60B 7/14; B60B 33/00; B60B 33/0015; B60B 33/0028; B60B 33/0068; B60B 2900/212
USPC .................................. 16/18 CG, 18 R, 29, 45
See application file for complete search history.

(56) References Cited

U.S. PATENT DOCUMENTS

| | | | | |
|---|---|---|---|---|
| 2,046,384 A * | 7/1936 | Morris | ......................... | 248/188.1 |
| 2,450,062 A * | 9/1948 | Voss et al. | .................. | 16/18 CG |
| 2,471,958 A * | 5/1949 | Humphreys | ............... | 16/18 CG |
| 2,483,241 A * | 9/1949 | Shepherd | .................... | 16/18 CG |
| 2,659,100 A * | 11/1953 | Cramer | ............................. | 16/22 |
| 2,981,969 A * | 5/1961 | Fontana | ..................... | 16/18 CG |
| 3,345,675 A * | 10/1967 | Haydock | .......................... | 16/45 |
| 3,349,426 A * | 10/1967 | Haydock | .......................... | 16/46 |
| 3,818,542 A * | 6/1974 | Jones | ......................... | 16/18 CG |
| D274,788 S * | 7/1984 | Simonsen | ..................... | D8/375 |
| 4,700,430 A * | 10/1987 | Raftery | ....................... | 16/18 CG |
| 4,800,617 A * | 1/1989 | Yeh | ............................. | 16/18 CG |
| 5,001,808 A * | 3/1991 | Chung | ........................ | 16/18 CG |
| 5,123,143 A * | 6/1992 | Carmack | .................... | 16/18 CG |
| 5,371,920 A * | 12/1994 | Rainville | ................... | 16/18 CG |
| 5,615,450 A * | 4/1997 | Butler | ........................ | 16/18 CG |
| 5,873,144 A * | 2/1999 | Tupper et al. | .............. | 16/18 CG |
| 6,125,504 A * | 10/2000 | Richards | ..................... | 16/18 CG |
| 6,568,031 B1* | 5/2003 | Polevoy et al. | .................... | 16/47 |
| 8,484,801 B2* | 7/2013 | Li et al. | ............................. | 16/32 |
| 2004/0088821 A1* | 5/2004 | Imperato | .................... | 16/18 CG |
| 2013/0097808 A1* | 4/2013 | Long et al. | ................. | 16/18 CG |

FOREIGN PATENT DOCUMENTS

CH 633996 A * 1/1983

* cited by examiner

*Primary Examiner* — William Miller
(74) *Attorney, Agent, or Firm* — Doherty, Wallace, Pillsbury & Murphy, P.C.

(57) ABSTRACT

The caster guard comprises a band which may surround a variety of conventionally known caster subassemblies, wherein exemplary caster subassemblies include those used on material handling carts. The band protects an individual's foot from injury. In an exemplary embodiment, the caster guard further comprises a top mounting plate attached to a side support that is attached to the band. In application, the top mounting plate is sandwiched between and secured to the caster mounting plate and a frame of the caster subassembly. In another embodiment, the caster guard comprises two opposing adjustable sleeves each disposed within two opposing clamp pads which are secured to the band. The sleeves may be engaged with a head bolt and a jam nut of the wheel axle unit of the caster subassembly.

9 Claims, 4 Drawing Sheets

INDUSTRIAL CASTER GUARD

BACKGROUND OF THE INVENTION

1. Field of the Invention

The invention is directed towards casters, and more particularly, to a caster guard for both rigid and swivel style casters.

2. Background of the Invention

The invention is a protective device to prevent foot injury to the operator and or bystander of various types of material handling equipment that contain rigid and or swivel style casters. The caster guard disclosed herein was designed due to injuries noted at various customer facilities resulting from casters installed on moving material handling carts.

SUMMARY OF THE INVENTION

Disclosed herein is a caster guard that provides protection to an operator's and/or a bystander's feet from injury caused by casters of, e.g., free moving material handling carts. The caster guard also protects an individual from injury due to walking into a caster with limited visibility and or which is hidden from view by, e.g., overhanging platforms. A large variety of industrial casters provide optional equipment, such as, e.g., foot brakes and swivel locks, that can also cause injury to the foot area.

The caster guard includes a band that is configured to protect the individual from these protrusions. The caster guard may be attached without any modifications to conventionally known casters, and do not require any additional hardware. Additionally, the caster guard may be formed in a variety of sizes to accommodate various wheel diameters and mounting plate options.

The main protective area of the invention comprises a band, which preferably has a rectangular or a rounded configuration, and which may include a variety of widths and openings, to suit the large variety of commercial industrial casters. In an exemplary embodiment, the caster guard may be captured between a conventionally known caster mounting plate and a frame to which the caster mounting plate is typically attached. In another exemplary embodiment, the caster guard has a pair of inner sleeves, one of each of which slides inside one of two opposing clamp pads attached to the inside of the band, and one of each of which mate with a hex head bolt and a hex jam nut on the wheel axle unit of a typically known caster subassembly, and are locked in position with clamp pad screws. These resulting caster guard assemblies do not require any modifications to the existing commercial caster subassemblies.

DETAILED DESCRIPTION OF THE INVENTION

Figure 1:
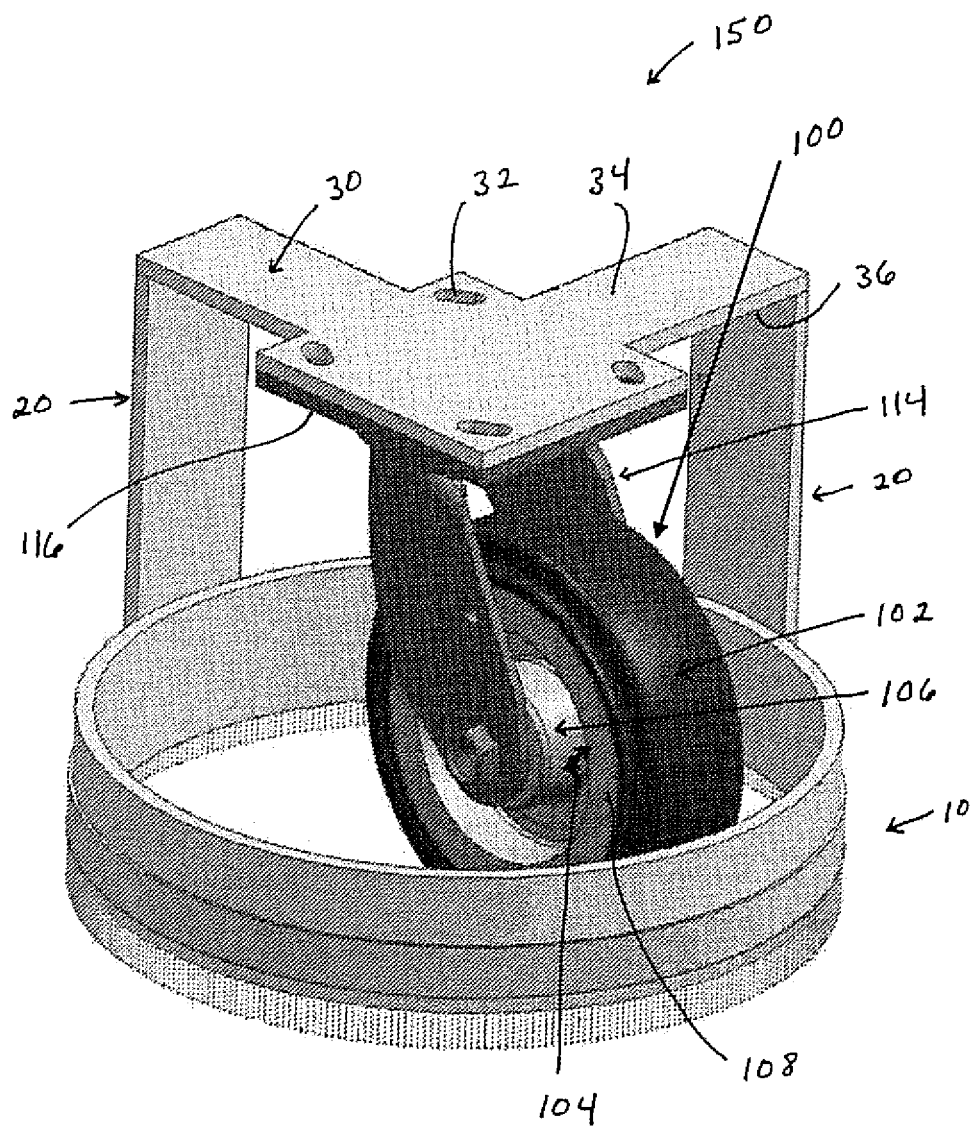
FIG. 1 is a schematic depicting an exemplary assembly comprising an exemplary caster guard attached to a conventional industrial type caster subassembly.
Figure 3:
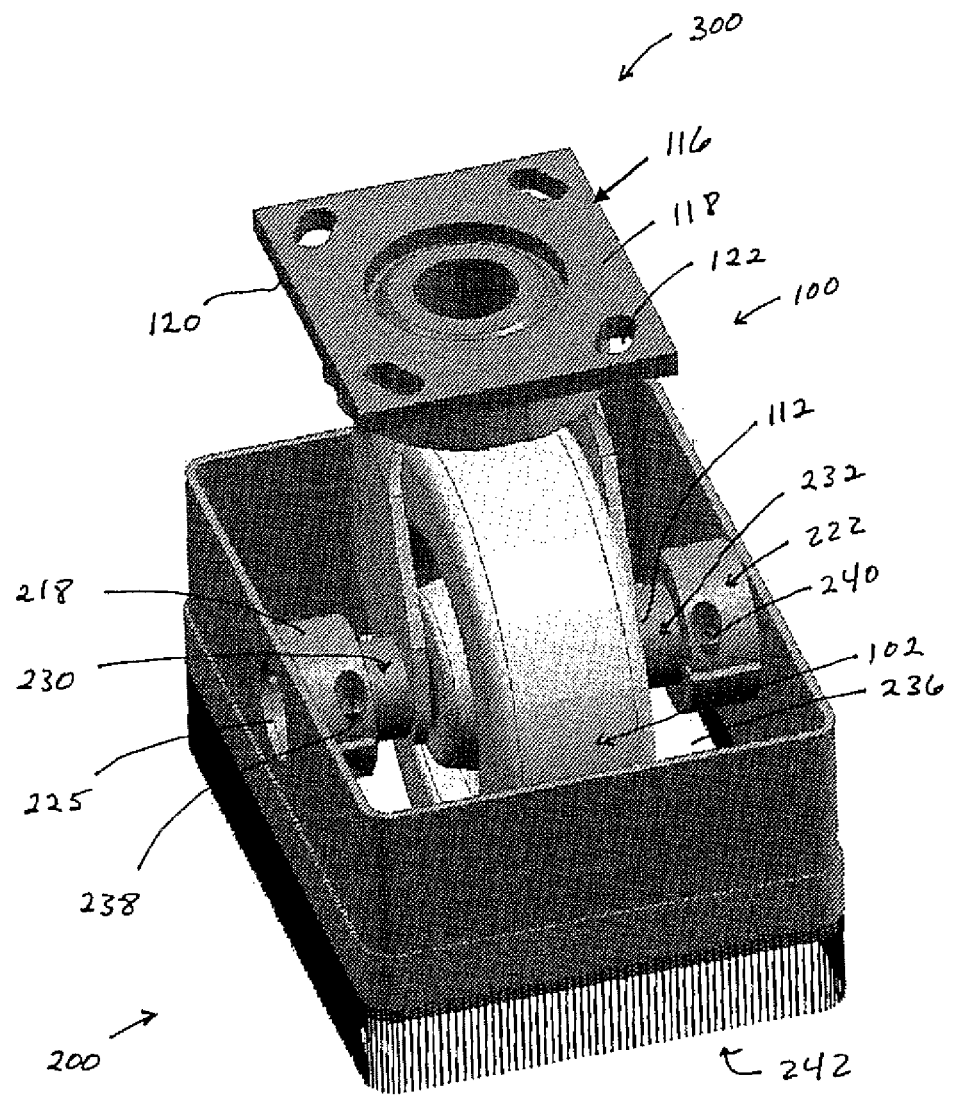
FIG. 3 is a schematic depicting another exemplary assembly comprising another embodiment of a caster guard attached to the caster subassembly shown in FIG. 1.

The caster guard disclosed herein is specially designed to be used with conventionally known rigid-type and swivel-type caster subassemblies. Referring to FIGS. 1 and 3, an exemplary caster subassembly 100 comprises a wheel 102 having a shaft 104 centrally formed therethrough. A bearing 106 is disposed through shaft 104 on a proximal side 108 thereof, and another bearing (not shown) is disposed through shaft 104 on a distal side 112 thereof. A hex jam nut (not shown) is positioned within bearing 106, and a hex head bolt (not shown) is inserted through the other bearing (not shown) such that the hex head bolt engages with the hex jam nut to thereby secure a yoke 114 to wheel 102. Caster subassembly 100 further comprises a caster mounting plate 116 which is engaged with yoke 114. Caster mounting plate 116 has a top side 118 oppositely situated to a bottom side 120, and further has a plurality of holes 122 formed through top and bottom sides 118 and 120. Plurality of holes 122 provides a means whereby caster subassembly 100 may be attached to a frame (not shown).

In an exemplary embodiment, the caster guard comprises a band which is designed to surround the wheel of the caster subassembly, and which comprises a suitable thickness and width to accommodate the optional equipment of commercial industrial swivel type casters and, in the case of a swivel caster, which will allow for the full 360 degree rotation of the wheel. The caster guard further comprises a mounting member that is engaged with the caster mounting plate to thereby secure the caster guard to the caster subassembly. In an exemplary embodiment, the mounting member comprises a side support that extends from the band, and a top plate that fits atop the side support and that offers a means whereby the caster guard may be fixed to the caster mounting plate. In application, the top plate is disposed between the caster mounting plate and the frame of the caster subassembly, and the wheel of the caster is surrounded by the band, and touches the floor without obstruction.

In another exemplary embodiment, the caster guard comprises a band having an opening which receives and surrounds the wheel of the caster subassembly, and which allows the wheel to touch the floor without obstruction. The caster guard further comprises two opposing clamp pads having mating bores attached to an inside wall of the band, and two opposing adjustable sleeves that respectively slip inside the clamp pads. The two adjustable sleeves each have an access hole formed therein, and each may be rotated and moved inward to align and fit with a hex head bolt and a hex jam nut of the caster subassembly. When the sleeves are in position the band may be rotated to a position parallel to the floor and locked into position with a clamp pad screw.

In an exemplary embodiment, each of the clamp pads comprises a split clamp collar. Additionally, a socket head cap screw may be used to secure the sleeve to the split clamp collar. Furthermore, the sleeves are preferably configured to slide fit into pilot holes formed in the split clamp collars.

The caster guard may be formed from a variety of materials, including, e.g., one or more of aluminum, alloy steel, stainless steel, acrylonitrile butadiene styrene (ABS), polyvinyl chloride (PVC), and the like. Additionally, the caster guard may be painted, powder coated, or anodized to a color of choice and attached to the various sizes and styles of conventionally known casters.

The caster guard may further include a skirt formed around a bottom side of the band for purposes of clearing debris. The skirt preferably comprises a brush type skirt formed from a material including at least one of polypropylene, palmyra, bassine, and the like.

The caster guard will further be described with reference to the drawings. While the present invention is susceptible of embodiment in various forms, there is shown in the drawings and will hereinafter be described presently preferred embodiments with the understanding that the present disclosure is to be considered an exemplification of the invention and is not intended to limit the invention to the specific embodiments illustrated.

Figure 2:
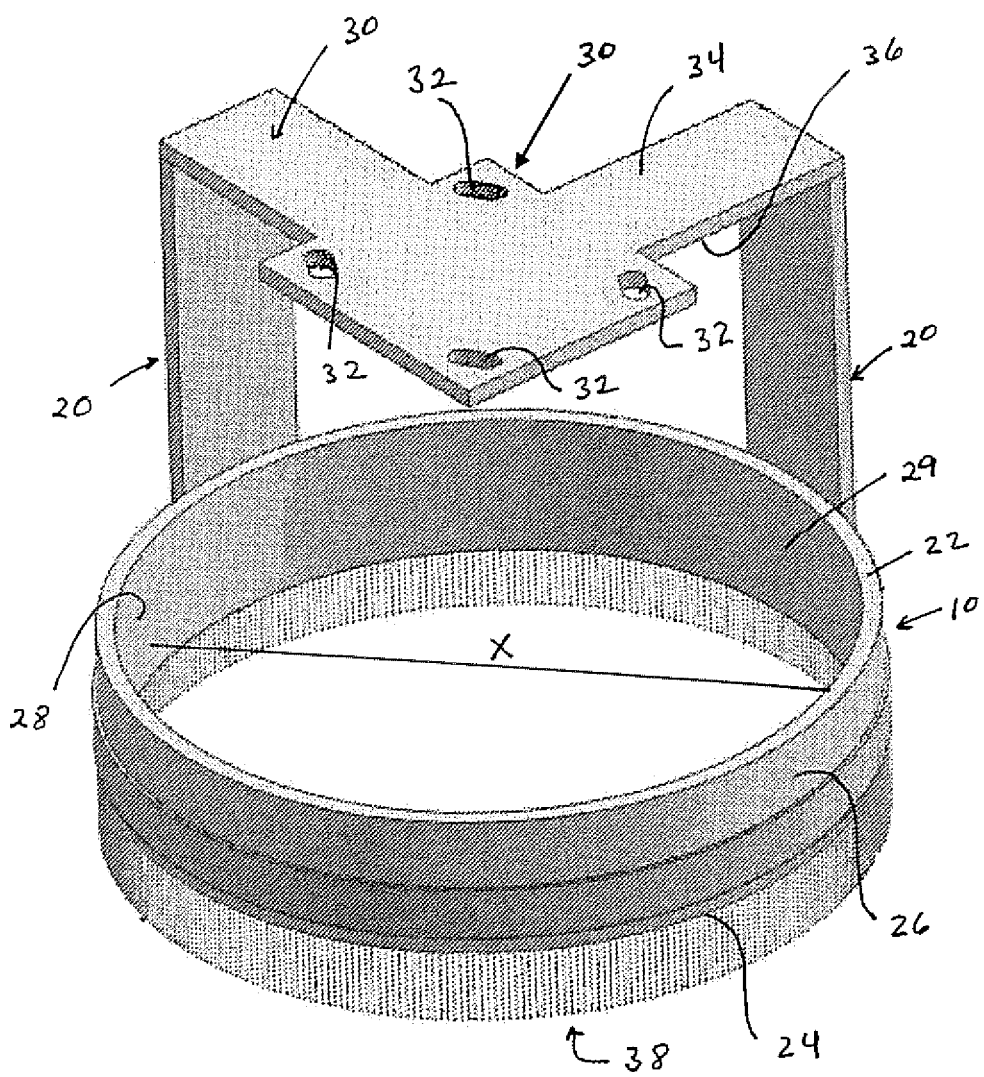
FIG. 2 is a schematic depicting the caster guard of FIG. 1.

An exemplary caster guard is depicted in FIG. 2. Referring to FIG. 2, caster guard 1 comprises a band 10. Although band 10 may include a variety of shapes and configurations including, e.g., a cylindrical configuration, a rectangular tubular configuration, and the like, in an exemplary embodiment, band 10 comprises a cylindrical configuration as shown in FIG. 2. As further shown in FIG. 2, band 10 comprises an open-ended top side 22 oppositely situated to an open-ended bottom side 24, and an outer wall 26 oppositely situated to an inner wall 28, wherein inner wall 28 defines an inside diameter X and surrounds an opening 29. Caster guard 1 further comprises a pair of legs 20 that is secured to band 10 and that linearly extends towards and away from top side 22. Legs 20 are spaced about 90 degrees apart from one another to facilitate access to the caster subassembly.

Caster guard 1 further comprises a top mounting plate 30 attached to pair of legs 20, and positioned centrally to inside diameter X of band 10. Top mounting plate 30 has a plurality of holes 32 formed through respective top and bottom sides 34 and 36 thereof. Caster guard 1 may further comprise a skirt 38 which extends from and surrounds bottom side 24 of band 10.

As shown in FIG. 1, caster guard 1 may be fixed to caster subassembly 100 to form an assembly 150. Here bottom side 36 of top mounting plate 30 is positioned adjacent to top side 118 of caster mounting plate 116 such that plurality of holes 32 is aligned with plurality of holes 122 of caster mounting plate 116. Hardware conventionally used to secure caster mounting plate 116 to a frame (not shown) of caster subassembly 100 may be used to secure top mounting plate 30 to caster mounting plate 116 and the frame, thereby securely sandwiching top mounting plate 30 between caster mounting plate 116 and the frame (not shown), and, thereby securing caster guard 1 to caster subassembly 100.

Figure 4:
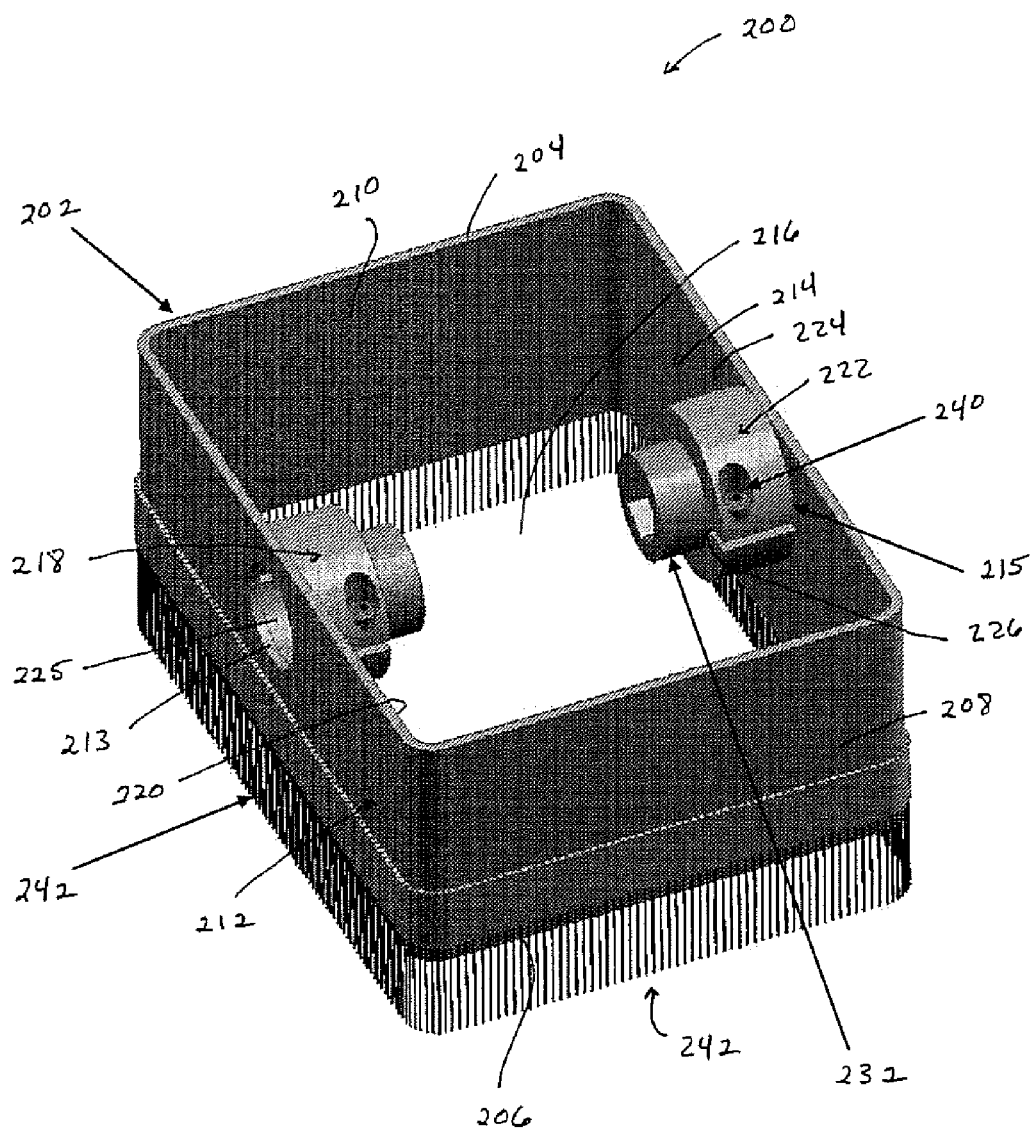
FIG. 4 is a schematic depicting the caster guard of FIG. 3.

FIGS. 3 and 4 depict another exemplary embodiment of the caster guard that is the subject of the present disclosure. Referring to FIG. 4, a caster guard 200 comprises a band 202 having a generally tubular and rectangular configuration. Accordingly, band 202 comprises an open-ended top side 204 oppositely situated to an open-ended bottom side 206, a forward side 208 oppositely situated to a rearward side 210, a proximal side 212 oppositely situated to a distal side 214, and an opening 216 surrounded by top and bottom sides 204 and 206 and forward and rearward sides 208 and 210. Each of proximal and distal sides 212 and 214 has a respective bore 213 and 215 centrally formed therethrough.

Caster guard 200 further comprise a clamp pad 218 disposed on an interior side 220 of proximal side 212 and a clamp pad 222 disposed on an interior side 224 of distal side 214. Each of clamp pads 218 and 222, each of which may comprise a split clamp collar, has a respective pilot hole 225 and 226 formed therethrough, wherein pilot hole 225 is aligned with bore 213 of proximal side 212, and pilot hole 226 is aligned with bore 215 of distal side 214.

Caster guard 200 further comprises a sleeve 230 and a sleeve 232, wherein each of sleeves 230 and 232 has a substantially tubular configuration. Each of sleeves 230 and 232 further comprises a centrally formed opening 234 and 236 having a hexagonal configuration. Sleeve 230 is slidably engaged within hole 225 of clamp pad 218, and sleeve 232 is slidably engaged within hole 226 of clamp pad 222. Caster guard 200 further comprises a skirt 242 that extends from and surrounds bottom side 206 of band 200.

Referring to FIG. 3, caster guard 200 is engaged with caster subassembly 100 to form an assembly 300. Here, sleeve 230 is engaged with the hex jam nut, and sleeve 232 is engaged with the hex head bolt of caster subassembly 100 such that wheel 102 is disposed within opening 236. Adjustable sleeves 230 and 232 may be rotated and moved inwardly to align and fit with the hex head bolt and the hex jam nut of the wheel axle unit. The two opposing clamp pads 218 and 222 secure respective sleeves 230 and 232 with a locking socket head screw respectively identified as 238 and 240.

From the foregoing it will be observed that numerous modifications and variations can be effectuated without departing from the true spirit and scope of the novel concepts of the present invention. It is to be understood that no limitation with respect to the specific embodiments illustrated is intended or should be inferred. The disclosure is intended to cover by the appended claims all such modifications as fall within the scope of the claims.

The invention claimed is:

1. A caster guard, comprising:
a band having an inside diameter sized to accommodate a wheel diameter of a wheel of a caster, wherein the band surrounds the wheel of the caster without obstruction; and
two vertical legs attached to the band, wherein the vertical legs are spaced 90 degrees from one another to allow access to the caster.

2. The caster guard according to claim 1, wherein the caster guard further comprises a top plate attached to a top side of each of the two vertical legs and central to the inside diameter of the band with mounting holes that mate with a mounting plate bolt hole pattern located on a base of the caster.

3. The caster guard according to claim 1, wherein the caster guard further comprises a brush skirt attached to the band.

4. The caster guard of claim 1, wherein the band has a circular configuration.

5. The caster guard of claim 1, wherein the band has a rectangular configuration.

6. A caster guard that surrounds an outside periphery of a wheel of a caster assembly, wherein the caster guard comprises:
a band having an exterior wall oppositely situated to an interior wall, wherein the interior wall has a diameter sized to accommodate a wheel diameter of the wheel of the caster assembly; and
two opposing split clamp collars attached to the interior wall of the band, wherein each of the split clamp collars comprises a pilot hole formed therethrough.

7. The caster guard according to claim 6, wherein the caster guard further comprises a first sleeve and a second sleeve wherein the first sleeve slide fits into the pilot hole of one of the split clamp collars, and the second sleeve slide fits into the pilot hole of the oppositely situated split clamp collar, wherein the first and second sleeves locate on a shoulder bolt and a lock nut of the caster assembly.

8. The caster guard according to claim 7, wherein the caster guard further comprises a socket head cap screw that secures the first sleeve to the split clamp collar in which the first sleeve is located, and another socket head cap screw which secures the second sleeve to the split clamp collar in which the second sleeve is located.

9. The caster guard of claim 6, wherein the band has a rectangular configuration.

\* \* \* \* \*